Dec. 27, 1949  J. E. BONDURANT  2,492,459
BLASTING CAP CIRCUIT TESTER
Filed Nov. 3, 1944
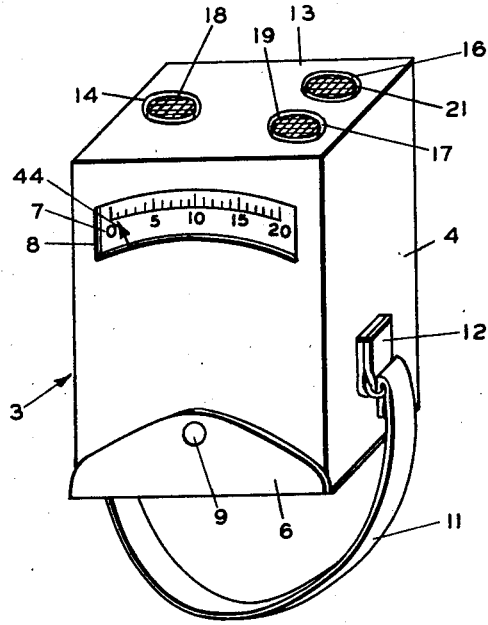
FIG.-1
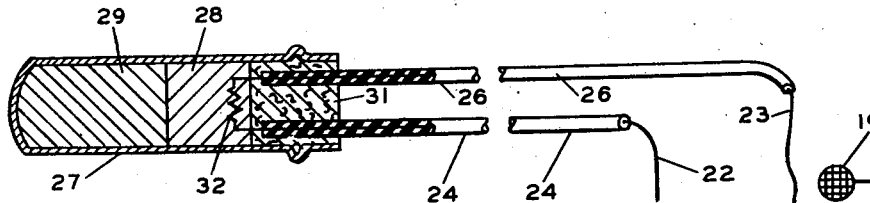
FIG.-2
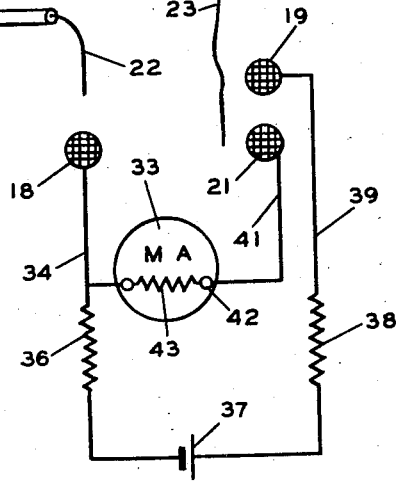
INVENTOR
J. E. BONDURANT
BY Hudson & Young
ATTORNEYS Patented Dec. 27, 1949

2,492,459

UNITED STATES PATENT OFFICE 2,492,459

BLASTING CAP CIRCUIT TESTER

John E. Bondurant, Bartlesville, Okla., assignor to Phillips Petroleum Company, a corporation of Delaware Application November 3, 1944, Serial No. 561,796

4 Claims. (Cl. 175—183)

This invention relates to a circuit tester. In one of its more specific aspects it relates to a blasting cap circuit tester in which means is provided for testing the tester and for testing the circuit. In another specific aspect it relates to a blasting cap circuit tester having two ranges depending on the resistance of the blasting cap circuit.

Difficulty has been experienced in the use of prior art circuit testers as such circuit testers are designed to test circuits containing a large number of caps only. Many of these old circuit testers have external switches which may be broken off or which may be left closed so that the battery will be discharged accidentally.

One object of the present invention is to provide a combination high and low resistance testing circuit for a single blasting cap, or any number of caps in series, or any number of caps in parallel.

Another object is to provide for the use of such a circuit with a bridging arrangement which eliminates all external switches.

Another object is to provide a handy and useful self contained circuit tester which may be carried on a person's belt or elsewhere on their person without painful contact and which can be rapidly and readily used without removal from the carrying case.

Numerous other objects and advantages will be apparent to those skilled in the art upon reading the accompanying specification and claims and studying the accompanying drawings.

In the drawings—

Figure 1 is a perspective view of an embodiment of the present invention showing the external appearance of the carrying case and instrument.

Figure 2 is an electrical diagram of the circuit testing apparatus showing it about to be applied to a circuit containing a blasting cap, the blasting cap being shown in cross section.

In Figure 1 a carrying case generally designed as 3 is provided, having a box like portion 4 provided with a lid or cover portion 6 and containing an instrument, the dial 7 of which shows through opening 8 in the case. The case 3 is preferably provided with any usual fastening means such as snap fastener 9 to locate the cover 6 around the instrument 7.

The material of which case 3 is made is preferably leather or rubber or some other similar soft yieldable and flexible material so that the hard, preferably metallic case of the instrument will not contact the person carrying the instrument. Case 3 is provided with a carrying strap 11 which may be any length strap and which is provided with the suitable fastening means 12 to secure it to the case. While strap 11 may be long enough to pass over the shoulder, I have found it preferable to have strap 11 a relatively short strap and then to pass the belt in the top of the trousers of the person carrying the instrument through strap 11 to support the instrument somewhere around the waist preferably in a position where bumping of the instrument during walking is minimized.

In the bottom 13 of case 3, there are provided holes 14, 16 and 17. In practice I often find it convenient to merge holes 16 and 17 into a single elliptical or hour glass shaped hole. Protruding through holes 14, 16 and 17 and substantially flush with the upper surface of bottom 13, but preferably slightly recessed therebelow are electric contacts 18, 19 and 21. These three electrical contacts are provided preferably with a rough upper surface such as a knurled surface having fairly sharp points thereon. These contacts will be discussed further below.

In Figure 2 it will be noted that contacts 18, 19 and 21 are shown in the central portion of the figure and adjacent said contacts are bare ends 22 and 23 of wires 24 and 26. As the circuit shown being tested is a blast cap circuit, and as wires in such a circuit are in contact with the ground in most instances, wires 24 and 26 are shown as insulated wires from which the insulation has been scraped at points 22 and 23. Obviously other circuits may be tested, which may or may not be composed of insulated or uninsulated wires, depending on how they are supported and their use.

Wires 24 and 26 are shown leading to a single blasting cap 27 of conventional type. Obviously any number of blasting caps may be contained in the circuit and they may be in series or in parallel or partly in series and partly in parallel, including wire splices which often cause shorts or open circuits.

Conventional blasting cap 27 is generally provided with a metal case 27 of brass or other metal containing powder or other explosive charges 28 and 29, a sealing or packing plug 31 and a resistance 32. Generally all that is concerned in the testing of the blasting cap 27, so far as the testing of the circuit, is resistance 32. However if resistance 32 should contact case 27 in two or more of the blasting caps a short circuit might exist between the blasting caps through the ground (not shown). And, of course, there may be other points in the extent of wires 24 and 26 where the circuit is broken or shorted, especially wire splices.

In order to test circuit 22 to 23 a circuit tester is provided as follows:

An ammeter 33 is provided. Ammeter 33 is preferably about a 0 to 10 milliammeter, but obviously any electrical engineer can select the desired ammeter to fit the electrical conditions existing in the circuit. A first electrical connection 34 is provided from one side of ammeter 33 leading directly to contact point 18. A second electrical connection is provided between the same side of ammeter 33 and contact point 19 and this second electrical connection preferably comprises a first resistance 36, a battery 37, a second resistance 38 and wire 39 connecting the resistances and battery in series. A third electrical connection 41 is provided directly between the other side 42 of said ammeter and the contact point 21.

While other values may be chosen, I prefer to have resistances 36 and 38 each 50 ohms. While other sources of direct current may be employed, I prefer to have battery 37 be a 1.02 volt chloride of silver cell. The average value of the internal resistance of such a cell 37 is about 4 ohms by test. The average resistance between contacts 18 and 21 through milliammeter coil 43 is about 2 ohms by test. The average resistance of blasting cap 27 is about 1 ohm. All the other wires are too short and too conductive to have resistance enough to change the values of the elements already assigned resistance values except wires 24 and 26, which when properly spliced should run about 2 ohms per hundred feet and wires 24 and 26 generally average a total of about 100 feet for the usual shot hole, as that length places the blaster pretty close, and in many instances the total length (and electrical resistance) of wires 24 and 26 is greater. This places the total minimum resistance of the blasting cap circuit at about 3 ohms and when there is more wire or two or more caps are in series the value is higher.

OPERATION

One of the most important considerations about the design of a blasting cap circuit tester is the safety factor. There must never be even the remotest chance of firing a blasting cap by the current received from the tester being used. For example some blasting caps require minimum current of about 200 milliamperes to fire them. The maximum current that can be delivered to the blasting cap circuit by the present invention when using the size resistance and battery mentioned above is about 10 milliamperes. This gives a factor of safety of about 20 which is considered highly satisfactory. At the same time large deflections are visible on the ammeter dial so that the testing is made easy and can be done rapidly without chance of error.

One of the bare ends 23 of the blasting circuit is bridged across contact positions 19 and 21 as shown in Figure 2. The bare end of wire 23 is held against the rough surface of contact points 19 and 21 by the pressure of the operator's thumb or finger, and the fact that he is contacting the wire and contact points with his finger does not effect the operation of the device. Nor does the fact that wire 26, cap 27, or wire 22 are grounded, or not, have any effect, as the resistance in wire 23 between 19 and 21 is so small no further decrease therein can be caused unless contact 18 were contacted which cannot occur without the operator's knowledge. This contact of wire 23 on points 19 and 21 completes the circuit through wire 41, ammeter 33, resistance 36, battery 37, resistance 38, wire 39 and wire 23. The resistances 36, 38 and the resistance 43 of the ammeter are so chosen with respect to the voltage amperage and internal resistance of battery 37 so that the needle 44 on dial 7 will be deflected almost about, or exactly the full length of the scale. The extent of deflection may be noted when the battery 37 is new for comparison with later readings to test the battery. One advantage of the chloride of silver cell is that the voltage is substantially constant even when the cell is almost completely discharged. This full scaled deflection of the needle shows that the circuit tester is in operating condition.

The advantage of two current limiting resistances is protection of the valuable chloride of silver cell from a shorted discharge which might be more likely to occur if there were only one resistance to be accidentally shorted out.

Example No. 1

For the purpose of giving some idea of the magnitude of suitable currents involved in the circuit of Figure 2 the following example is given, it being understood other circuit values may be employed in the practice of my invention:

$e$ = potential in volts
$I$ = current in amps.
$R$ = resistance in ohms
$e = IR$ (Ohm's law)
$R = R_{43} + R_{36} + R_{37} + R_{38}$ Resistances of parts 43, 36, 37 and 38 are noted as "R" with the reference numeral as a subscript.

$e = 1.02$ volts
$R_{43} = 2$ ohms
$R_{36} = 50$ ohms
$R_{37} = 4$ ohms
$R_{38} = 50$ ohms Substituting is Ohm's law above:

$1.02 = I(2 + 50 + 4 + 50)$
$I = 0.0096$ amps. $= 9.6$ milliamps.

Now this current (I) of about 10 milliamperes is not sufficient to set off blasting cap 32 which requires 200 milliamperes to fire the same even if wire 23 were placed on contact 19 and wire 22 on contact 21. As mentioned above a factor of safety of 20 still exists. It will also be seen by Ohm's law that as long as at least one of resistances 36 or 38 protects its end of battery 37 that less than 20 milliamperes can be drawn from the battery (there being 54 ohms resistance and 1.02 volts potential in this system) leaving a factor of safety of 10 regardless of how the rest of the circuit is shorted.

While still holding bare wire 23 across contacts 19 and 21 the operator then takes bare wire 22 and contacts it to contact 18. Thus while still maintaining the first circuit through wires 41 and 39 and the other elements enumerated above the operator has now established a second circuit 34, 18, 22, 24, 32, 26 and 23 in parallel to said first circuit and the current of battery 37 is divided between the two circuits. For a normal blasting circuit the ammeter will deflect to about half of scale 7 depending on the resistance of the blasting circuit. The operator is holding wire 23 on contact 19 and 21 while wire 22 is similarly held on contact 18 by another of his fingers or thumbs. At the low voltage employed the human body is substantially non-conducting and does not effect the reading enough to amount to anything.

If the blasting circuit is open (due to a poor connection or a broken lead wire or similar trouble) the meter will continue to show maximum deflection of full scale when wire 22 is applied to contact 18. On the other hand if the blasting circuit 24, 26 is shorted the meter needle 44 will drop back to zero, or give a minor deflection somewhere between normal and zero when wire 22 is applied to contact 18, and if this short is sufficient to cause trouble in the operation of the blasting circuit there will be a considerable difference between the normal and observed deflection of needle 44, as of course the operator is experienced in knowing how much resistance to expect in the circuit when normal, as he knows the lengths and resistances of the blasting cap circuit being tested.

*Example No. 2*

When wire 22 is on contact 18, and wire 23 contacts both contacts 19 and 21 in the circuit of Figure 2, and using the same values as in Example No. 1 above (it being understood that other circuit values may be employed to practice the invention), the current $I_{43}$ in the milliammeter 43 and the resulting position of hand 44 can be calculated as follows:

Let the resistance of parts 36, 37 and 38 be called $R_a$, resistance of parts 22, 32 and 23 be called $R_b$ and the resistance of milliammeter 41, 43 be called $R_c$, the currents therein as $I_n$ where $n$ is the respective letter, and the E. M. F. of battery 37 be called $e$. Then:

$$R_a = 104 \text{ ohms}$$
$$R_b = 3 \text{ ohms} \quad e = 1.02 \text{ volts}$$
$$R_c = 2 \text{ ohms}$$
$$e = IR = I\left(\frac{R_b R_c}{R_b + R_c} + R_a\right)$$
$$I = e\left(\frac{R_b + R_c}{R_b R_c + R_a R_b + R_a R_c}\right) = 0.0097 \text{ amps.}$$
$$\frac{I_c}{I_b} = \frac{R_b}{R_c}$$
$$I_b = I - I_c$$
$$I_c = \frac{R_b I}{R_c - R_b} = 0.00582 \text{ amps.}$$

Other circuits will give other values which may be similarly calculated; or the following formula may be used:

$$I_c = \frac{e(R_b^2 + R_b R_c)}{R_a R_b^2 + R_a R_c^2 + R_b^2 R_c + R_b R_c^2 + 2 R_a R_b R_c}$$

If a large number of blasting caps are connected in series (or there is some other reason for higher resistance in blasting circuit 24, 26) then after testing the tester with wire 23 across contacts 19 and 21 and with wire 22 not in contact with anything, then wire 23 can be removed from one of contacts 19 and 21 and wire 22 applied to the other of contacts 19 and 21. This provides a series circuit which will be as follows giving the numbers of the parts: 19, 23, 26, 32, 24, 22, 21, 41, 42, 43, 36, 37, 38, 39 and 19. This single series circuit gives a second range to the deflection of needle 44 (and with the circuit values given in Examples 1 and 2 above, except letting the resistance of the blasting cap circuit substituted for 22, 32 and 23 of Figure 2 of 100 ohms, the milliammeter 33 will indicate a current of 0.00495 amps.) and of course dial 7 can be calibrated or marked with both ranges as desired or instead, as shown, equally spaced marks on the dial may be employed and the operator supplied with a chart giving values to the numbers shown in both the parallel and series hook ups.

While other cells can be used the silver chloride cell has the advantage of self limitation of current so that an added safety factor is given to prevent accidental firing of a blasting cap. A chloride of silver, or silver chloride cell (both are the same) is defined on page 1875 and page 1879 of "Handbook of Chemistry and Physics," 24th edition, Chemical Rubber Publishing Company, Cleveland, Ohio (1940).

Obviously the usual accident will only short one resistance 36 or 38 at a time, and this will be detected before the other resistance can be shorted, so protection is always maintained.

The bridging arrangement shown where wires 22 and 23 are held against rough contacts 18, 19 and 21 eliminates all troublesome switches and allows a fully water proofed case to be used. If a switch were to be used, there would always be the chance that it would be left on and this would drain the silver chloride cell 37 in a very short time. With the bridging arrangement as proposed the current flow ceases as soon as the operator removes the wire from contacts 18, 19 and 21. These wires cannot be fastened to the contacts. They will fall away as soon as the operator removes his hands from the unit. This makes for simplicity of operation and long cell life.

Formal changes may be made in the specific embodiment of the invention described without departing from the spirit of the broad invention, the scope of which is commensurate with the appended claims.

Having described my invention, I claim:

1. A circuit for testing a blasting cap comprising, in combination, a first contact, a second contact, and a third contact, said contacts being readily accessible for connection of an exterior circuit thereto, an ammeter connected across the first and second contacts, and a circuit connected across said first and third contacts, said circuit including a source of electromotive force and a resistance connected in series therewith whereby, upon interconnection of said second and third contacts, a deflection of said meter is produced for calibration purposes, and whereby the circuit between said first contact and the interconnected second and third contacts provides a shunt testing circuit, and the circuit between said second and third contacts provides a series testing circuit.

2. A circuit for testing a blasting cap comprising, in combination, a first contact, a second contact, and a third contact, said contacts being readily accessible for connection of an exterior circuit thereto, an ammeter connected across the first and second contacts, and a circuit connected across said first and third contacts, said circuit including a silver chloride cell and a resistance connected in series therewith, said cell limiting the current flow through the testing circuit, whereby, upon interconnection of said second and third contacts, a deflection of said meter is produced for calibration purposes, and whereby the circuit between said first contact and the interconnected second and third contacts provides a shunt testing circuit, and the circuit between said second and third contacts provides a series testing circuit.

3. A circuit for testing a blasting cap comprising, in combination, a first contact, a second contact, and a third contact, each of said contacts having a knurled surface permitting a bare wire conductor to be effectively connected thereto by the pressure of a finger against the contact, an ammeter connected across the first and second contacts, and a circuit connected across said first and third contacts, said circuit including a silver chloride cell and a resistance connected in series therewith, said cell limiting the current flow through the testing circuit, whereby, upon interconnection of said second and third contacts, a deflection of said meter is produced for calibration purposes, and whereby the circuit between said first contact and the interconnected second and third contacts provides a shunt testing circuit and the circuit between said second and third contacts provides a series testing circuit.

4. A circuit tester for indicating the condition of a blasting cap which comprises, in combination, a case, a first contact, a second contact, and a third contact, all mounted on said case and each having an exposed surface at the outside of said case, an ammeter connected across the first and second contacts, and a circuit connected across said first and third contacts, said circuit including a source of electromotive force and a resistance connected in series therewith whereby, upon interconnection of said second and third contacts, a deflection of said meter is produced for calibration purposes, and whereby the circuit between said first contact and the interconnected second and third contacts provides a shunt testing circuit, and the circuit between said second and third contacts provides a series testing circuit.

JOHN E. BONDURANT.

REFERENCES CITED

The following references are of record in the file of this patent:

UNITED STATES PATENTS

| Number | Name | Date |
| --- | --- | --- |
| 945,964 | Marks | Jan. 4, 1910 |
| 956,877 | Beattie | May 3, 1910 |
| 1,301,434 | Heitman | Apr. 22, 1919 |
| 1,593,024 | Macadie | July 20, 1926 |
| 1,690,118 | Julyan | Nov. 6, 1928 |
| 1,925,694 | Hawkins | Sept. 5, 1933 |
| 2,098,212 | Wilkinson | Nov. 2, 1937 |
| 2,163,475 | Tomalis | June 20, 1939 |
| 2,179,901 | Smith | Nov. 14, 1939 |
| 2,255,946 | Smith | Sept. 16, 1941 |
| 2,290,307 | Wicker | July 21, 1942 |

FOREIGN PATENTS

| Number | Country | Date |
| --- | --- | --- |
| 239,085 | Germany | Oct. 7, 1911 |

OTHER REFERENCES

Wireless World, August 1943, pages 224-227.